R. A. FESSENDEN.
METHOD OF WIRELESS SIGNALING.
APPLICATION FILED JULY 1, 1907.

918,306.

Patented Apr. 13, 1909.
2 SHEETS—SHEET 1.

R. A. FESSENDEN.
METHOD OF WIRELESS SIGNALING.
APPLICATION FILED JULY 1, 1907.

918,306.

Patented Apr. 13, 1909.
2 SHEETS—SHEET 2.

WITNESSES:
Jessie E. Bent
Adeline Wolene

INVENTOR:
Reginald A. Fessenden

UNITED STATES PATENT OFFICE.

REGINALD A. FESSENDEN, OF BRANT ROCK, MASSACHUSETTS.

METHOD OF WIRELESS SIGNALING.

No. 918,306.  Specification of Letters Patent.  Patented April 13, 1909.

Application filed July 1, 1907. Serial No. 381,732.

*To all whom it may concern:*

Be it known that I, REGINALD A. FESSENDEN, a citizen of the United States, residing at Brant Rock, in the State of Massachusetts, have invented a certain new and useful Method of Wireless Signaling, of which the following is a specification.

This invention relates to electric signaling, and especially to methods of prevention of atmospheric and other disturbances, which is its primary object.

Figures 1, 2:
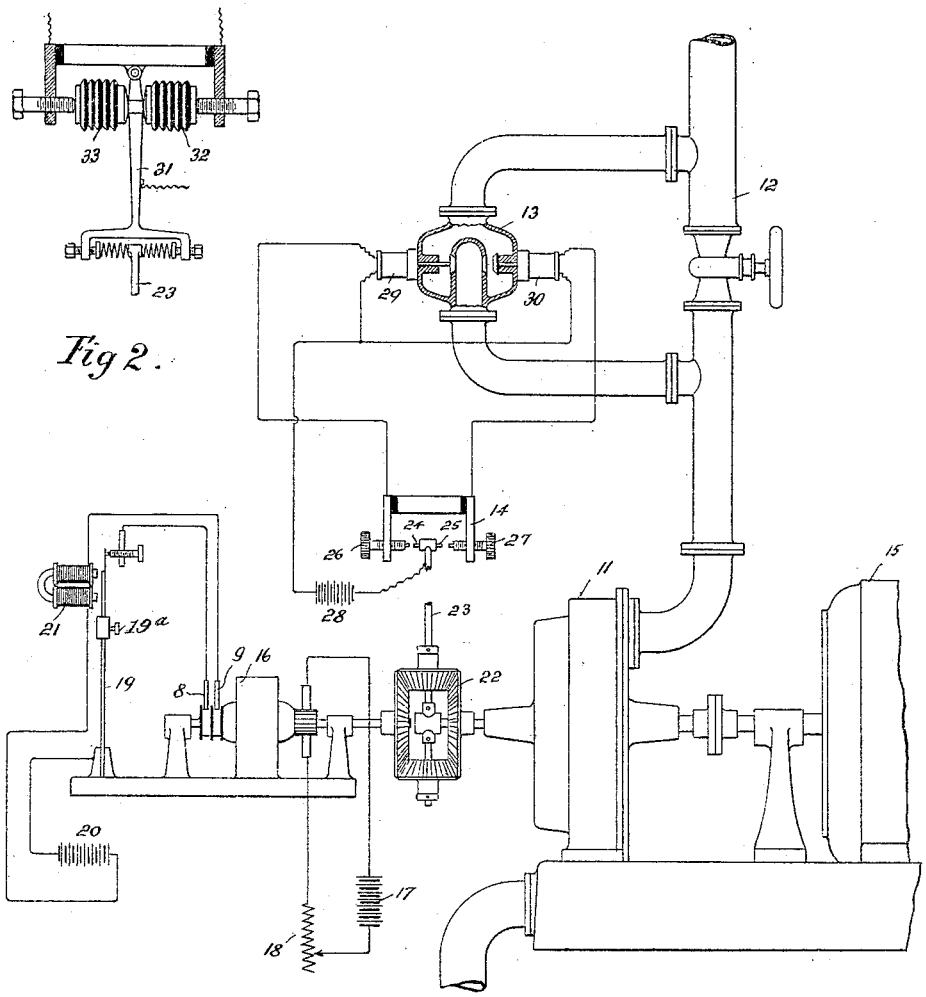
Figure 3:
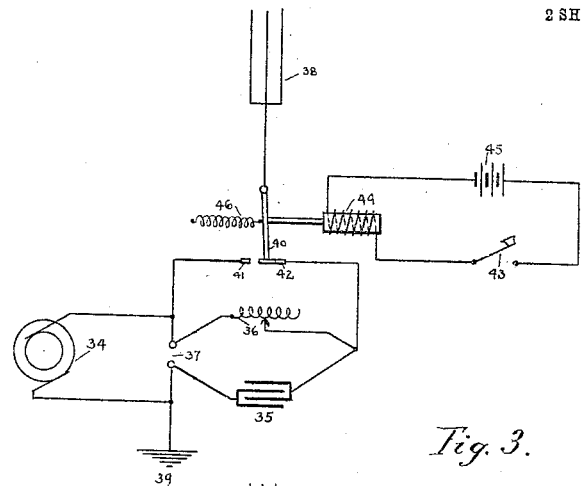
Figure 4:
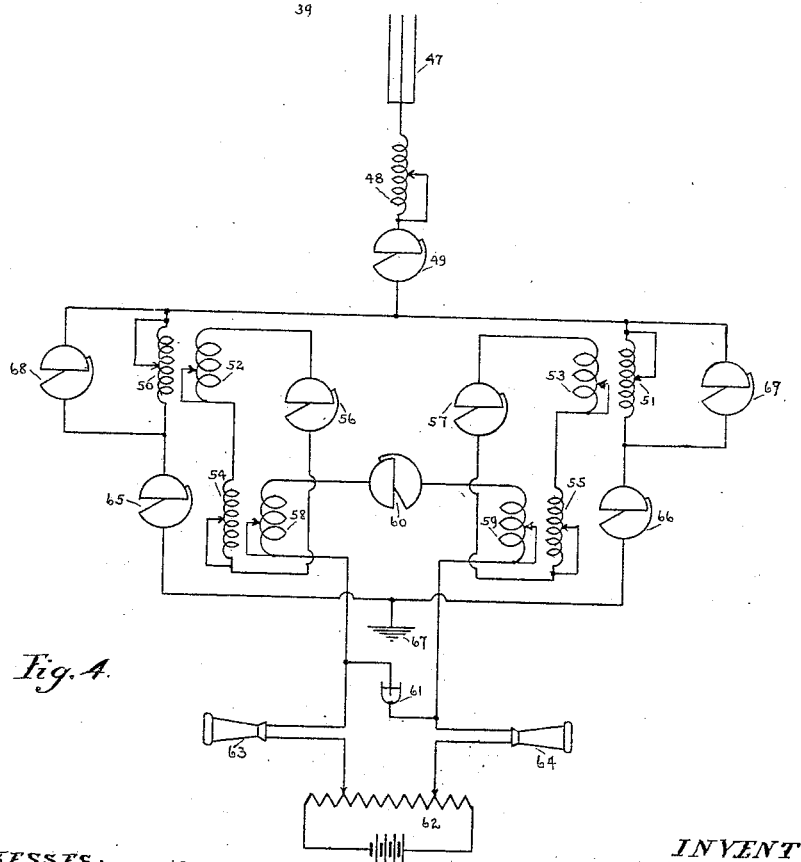

In the accompanying drawings forming a part of this specification Figure 1 shows an arrangement of apparatus for carrying out my invention, Fig. 2 shows a detail of a governing device, Fig. 3 shows an arrangement of circuits for use in sending and Fig. 4 an arrangement of circuits for use in receiving.

Great difficulty has been experienced in wireless signaling on account of electric disturbances, more particularly atmospheric disturbances. In the tropics, for example, stations equipped with the usual type of apparatus as a rule are unable to work at all for months at a time except at brief intervals and even in the more northern climates the same difficulties occur during the summer months. By my apparatus and method herein described I succeed in annulling the effects of disturbances, and more particularly such atmospheric disturbances.

In Fig. 1, 11 represents a steam turbine, 12 a throttle valve in the steam pipe leading to the steam turbine, 13 a governing valve operated by the electric contact device 14. This turbine drives the alternating current dynamo 15, having a frequency higher than the usual commercial frequencies but of a frequency sufficiently low to be well within the limits of audibility, (for example, a frequency of 900 is suitable for the dynamo). 16 is a continuous current motor driven by the storage battery 17 and having its speed regulated by the rheostat 18. The speed of this motor is governed by the vibrator reed 19 which makes and breaks the local circuit containing the battery 20, magnet 21 and a coil wound on the armature of the motor 16 and connected to the brushes 8, 9, the rate of vibration being altered at will by shifting the weight 19ª on the reed. This method of governing known as the Wadsworth method, is well known. 22 is a set of differential gears attached to the shaft of the governing motor 16 and to the shaft of the turbine 11 so that if the speed of the turbine varies from that of the governing motor 16, the arm 23 carrying the contact brushes 24, 25 will be carried forward or backward and make contact with the contact 26 or the contact 27 thereby operating the valve 13 by means of the current from the battery 28 flowing through the magnet coils 29 and 30, when the contacts 26, 24, or 25, 27 respectively are closed. (In the view of Fig. 1 the contacts are shown turned 90° out of normal position, to show the arrangement clearly.)

In Fig. 2 is shown an alternative form of regulator for use in place of making the contacts 24, 26 and 25, 27. In this the arm 23 operates by the lever 31 to produce a pressure on the carbon plates 32, 33 and thereby vary the current in the magnets 29, 30, respectively, and thus regulate valve 13.

I show a suitable circuit for signaling in Fig. 3, where 34 shows a source of voltage, for example an alternating current dynamo giving a voltage of 25,000 volts at a frequency of 500 periods per second or the dynamo of Fig. 1 being used. 35 is a capacity which may consist of compressed air condensers. 36 is an adjustable inductance which may consist of a straight piece of copper wire and a sliding contact as shown. 37 is a spark gap and 38 is an antenna grounded at 39. 40 is a movable contact arm so arranged as to connect with the contacts 41 and 42 according as the key 43 is depressed or not, the key 43 actuating the movable arm 40 by means of the magnet 44 energized by the local battery 45, 46 being a spring for the purpose of holding the movable contact arm 40 normally against contact 41. In this method of operating the spark passes continuously whether signals are being sent or not, the frequency of the signals emitted being different when the key 43 is depressed from that obtaining when the key is in its normal position. Fig. 4 shows a form of receiving device especially adapted for this work and forming an interference preventer. In this an antenna 47 of any suitable type is grounded at 67, and 48 is a variable inductance, and 49 a variable capacity in circuit with it. 50, 51 are primaries, and 52, 53 the secondaries of variable transformers. These secondaries are connected to the primaries 54 and 55 of a second set of variable transformers having secondaries 58 and 59, the variable condensers 56 and 57 being connected in circuit as shown. The secondaries 58, 59 of the second pair of variable transformers are connected so as to oppose each other, while the condenser 60, preferably variable, and the receiver 61 are in series with these secondaries. 62 is a potentiometer and 63, 64 are telephone receivers. 65, 66, 68, 69 are variable condensers; but condensers 68, 69 may be omitted. The circuit 47, 48, 49, 51, 66, 67 and the circuit 53, 55, 57 are preferably tuned to the frequency which it is desired to receive, and the other circuit 47, 48, 49, 50, 65, 67 and the circuit 52, 54, 56 are preferably tuned to other frequencies. Oscillations not in resonance divide equally between the two branches. The circuit 58, 60, 59, 61 may be tuned or not, and preferably it is not tuned.

In experimenting with a high frequency alternator having a frequency of 80,000 in order to determine the integrating effect of certain types of receivers, it was noted by me that when the trains of waves were broken up into different lengths, when the trains succeeded each other at a frequency above the normal frequencies used for alternating current work, the signals become more distinct in the presence of atmospheric disturbances. It was noted for example, that in a specific case where it is impossible to determine whether the experimental station was sending or not when the sparks succeeded each other at a frequency of 250 (being generated by dynamo of approximately 125 cycles per second,) yet the signals could be easily read when the spark frequency was raised to 900. I discovered and experimentally determined that the main reason for this was a physiological phenomenon, *i. e.* that when the higher frequencies were being used for signaling the attention of the hearer was concentrated on the higher notes to such an extent that the lower noises made by atmospheric disturbances ceased to affect the consciousness. On the other hand when the sparks were produced by alternating currents of the usual frequency it was impossible to concentrate the hearing upon the signals and reception could not be accomplished. This physiological effect was found by experiment to be so marked that messages could be read with the greatest of ease at a spark frequency of 900 per second, when at a spark frequency of 250 per second it is impossible to tell whether the station was sending or not, although with the same settings at a time when there is no atmospheric disturbances both sets of signals were as measured by shunt on the telephone of equal strength.

Heretofore in the practice of the art, where spark frequencies have been used as a means of obtaining selectivity, this has been done by depending upon mechanical selectivity alone, without electrical tuning to the wave frequency or group frequency (as shown for example, by British Patent 28,955/96, to Brown, and later in Blondel's U. S. Patent 783,923 filed December 3rd, 1900, page 1, lines 33 to 37) or by the combination of tuning electrically to the wave frequency and mechanically or electrically tuning to the group frequency; (see Fessenden U. S. Patents 727,325 filed June 2, 1900 and 706,742 filed June 6, 1902; also shown later in Shoemaker's U. S. Patent 749,584, filed Oct. 3, 1902, and Stone 767,982, filed November 25, 1903). In all the above cases, however, the selectivity was obtained through the use of group frequencies by tuning the receiver mechanically or electrically, so that it would only respond to a given group frequency. In the present application, on the other hand, the selectivity, or freedom from disturbance, is not obtained by mechanical or electrical tuning to the group frequency of 1000 sparks per second, but physiologically by making use of the novel physiological effect discovered by the applicant and described above, which discovery has later been independently corroborated in a paper published in the *Philosophical Magazine* November, 1907 by Lord Rayleigh, who therein points out that this physiological discovery was contrary to what had theretofore been supposed to be the case.

It is to be noted that where, as in applicant's prior U. S. patent 727,331, filed March 21, 1903, group or spark frequencies as high as 500 cycles per second have been used in connection with mechanical or electrical tuning to the group frequencies, this did not involve the discovery or use of the present physiological method of selectivity, since, with the mechanical or electrical group tuning already referred to, the disturbing frequencies were already cut out, or else produced a note of the same frequency as that to which the circuit was already tuned. For example, any irregular atmospheric disturbance which affected the receiver would cause an electrical or mechanical oscillation in the receiver of the same group frequency as that to which the receiver was already tuned, in the same way as random blows on a tuning fork will cause it to vibrate at a particular definite periodicity, always giving the same note.

Any suitable means of obtaining the desired spark frequency may be used, as for example an alternating current dynamo having a frequency of 500 cycles, as above referred to. While the receiver may also be mechanically tuned to the group, frequency, this is not always advantageous, and moreover it is not part of the present invention, having been already shown and claimed in my prior patent No. 727,325, of May 5th, 1903.

In describing the indicator as "resonantly unresponsive" to the group frequency, such phrase is intended to mean an indicator which on being affected by aperiodic impulses does not emit a note of the group frequency being used.

The apparatus herein disclosed is not here claimed but is claimed in my divisional application No. 450,163 filed August 25th, 1908.

Having thus described my invention and illustrated its use, what I claim as new and desire to secure by Letters Patent, is the following:

1. In the art of wireless signaling, the method of eliminating disturbing impulses which comprises generating waves having a definite frequency, in groups having a definite group frequency above 250 per second but within the limits of audibility, and receiving the same with an indicator resonantly unresponsive to said group frequency.

2. In the art of wireless signaling, the method of eliminating disturbing impulses physiologically by generating waves of a definite frequency in groups having a group frequency between 250 per second and the upper limit of audibility, receiving the same with a receiver which is resonantly unresponsive to said group frequency, and arranging the receiving circuits so that said disturbing impulses are divided therein and oppose each other's effects on the receiver.

3. In the art of wireless signaling, the method of eliminating disturbing impulses which comprises generating waves having a definite frequency, in groups having a definite group frequency of approximately 1000 per second, and receiving the same with an indicator which is unresponsive, resonantly, to said group frequency.

4. In wireless signaling, the method of eliminating disturbing impulses by cutting out a portion of the same electrically by means of tuned circuits, eliminating another portion by means of other electrically tuned circuits so arranged that the effects of the disturbing impulses oppose each other, and finally eliminating the balance of the disturbing impulses physiologically by using a group frequency for the signal impulses higher than 125 per second but within the limits of audibility.

In testimony whereof I have hereunder signed my name in the presence of the subscribed witnesses.

REGINALD A. FESSENDEN.

Witnesses:
THOMAS B. BLACKMAN,
JESSIE E. BENT.